United States Patent
Kim et al.

(10) Patent No.: US 7,485,395 B2
(45) Date of Patent: Feb. 3, 2009

(54) NEGATIVE ACTIVE MATERIAL FOR RECHARGEABLE LITHIUM BATTERY AND METHOD OF PREPARING SAME

(75) Inventors: Sang-Jin Kim, Suwon (KR); Kyou-Yoon Sheem, Ohsan (KR); Joon-Sup Kim, Suwon (KR)

(73) Assignee: Samsung SDI Co., Ltd., Suwon-si (KR)

(*) Notice: Subject to any disclaimer, the term of this patent is extended or adjusted under 35 U.S.C. 154(b) by 833 days.

(21) Appl. No.: 10/743,910

(22) Filed: Dec. 24, 2003

(65) Prior Publication Data

US 2004/0137328 A1    Jul. 15, 2004

(30) Foreign Application Priority Data

Dec. 26, 2002   (KR) ............... 10-2002-0084156

(51) Int. Cl.
*H01M 4/58* (2006.01)
*H01M 4/60* (2006.01)

(52) U.S. Cl. ............... 429/231.8; 429/212; 429/213

(58) Field of Classification Search .......... None
See application file for complete search history.

(56) References Cited

U.S. PATENT DOCUMENTS 5,401,598 A * 3/1995 Miyabayashi et al. .... 429/231.9
6,066,413 A * 5/2000 Aymard et al. ............ 429/217
6,355,377 B1 * 3/2002 Sheem et al. ........... 429/231.8
6,403,259 B1   6/2002 Kitagawa et al.

FOREIGN PATENT DOCUMENTS

| JP | 11-265716 | 9/1999 |
|----|-----------|--------|
| JP | 11-354122 | 12/1999 |
| JP | 2001-110422 | 4/2001 |
| JP | 2002-075362 | 3/2002 |
| JP | 2002-260658 | 9/2002 |

* cited by examiner

*Primary Examiner*—Patrick Ryan
*Assistant Examiner*—Julian Mercado
(74) *Attorney, Agent, or Firm*—Stein, McEwen & Bui, LLP

(57) ABSTRACT

A negative active material of a rechargeable lithium battery includes a crystalline carbon core having an intensity ratio Ra I(1360)/I(1580) of a Raman Spectroscopy peak intensity I(1360) at a (1360) plane to an Raman Spectroscopy peak intensity I(1580) at a (1580) plane of 0.01 to 0.45 and a shell with a turbostratic or half-onion ring structure coated on the core, the shell including crystalline micro-particles and a semi-crystalline carbon, the shell having an intensity ratio Ra I(1360)/I(1580) of a Raman Spectroscopy peak intensity I(1360) at a (1360) plane to a Raman Spectroscopy peak intensity I(1580) at a (1580) plane of 0.46 to 1.5.

21 Claims, 2 Drawing Sheets

NEGATIVE ACTIVE MATERIAL FOR RECHARGEABLE LITHIUM BATTERY AND METHOD OF PREPARING SAME

CROSS-REFERENCE TO RELATED APPLICATIONS

This application is based on application No. 2002-84156 filed in the Korean Intellectual Property Office on Dec. 26, 2002, the disclosure of which is incorporated hereinto by reference.

BACKGROUND OF THE INVENTION

1. Field of the Invention

The present invention relates to a negative active material for a rechargeable lithium battery and a method of preparing the same and more particularly, to a negative active material for a rechargeable lithium battery exhibiting good discharge capacity, efficiency, and cycle life characteristics and a method of preparing the same.

2. Description of the Related Art

A negative active material for a rechargeable lithium battery uses carbonaceous materials such as amorphous carbon or crystalline carbon. Among these carbonaceous materials, crystalline carbon such as artificial graphite and natural graphite is widely used because of its high capacity.

It is considered that natural graphite exhibits a higher charge and discharge capacity than artificial graphite, and hence satisfies the demands for batteries with higher capacity. However, high reactivity of the natural graphite limits the electrolyte. In addition, natural graphite is easily plate-shaped by pulverizing and sieving, which increases the degree of graphitization (crystallinity) to increase capacity. The plate-shaped graphite deteriorates battery performance factors.

To overcome such problems, various studies on development of a negative active material that exhibits advantages of both a crystalline carbon and an amorphous carbon have been undertaken.

Japanese Patent Application No. 2000-265417 SAMSUNG SDI CO., LTD. discloses a negative active material, including a crystalline carbon core and a semi-crystalline carbon shell formed on the core. The shell includes elements serving as graphitization catalysts.

Japanese Patent Application No. 2000-261046 discloses a negative active material which is produced by oxidize-heat treating graphite powder and shaving a surface of the resultant to break a closed structure of the surface of the graphite into an open structure followed by heat-treating it while rapidly increasing the temperature, thus re-forming a closed structure of the surface of the graphite. The graphite powder is produced by carbonizing carbonaceous materials, and pulverizing and graphitizing it. However, even though the negative active material has substantially no reactivity with the electrolyte, it has a lower discharge capacity than natural graphite.

U.S. Pat. No. 6,403,259 discloses a negative active material produced by grinding natural graphite or artificial graphite and coating the resulting material with a carbon precursor. The negative active material exhibits improved storage properties at a high temperature, better discharge characteristics at a low temperature, and it has a density of 1.20 g/cc. However, a low-crystallinity carbon surface having reactivity with an electrolyte may be present on the negative active material.

SUMMARY OF THE INVENTION

It is an aspect of an embodiment of the present invention to provide a negative active material for a rechargeable lithium battery having a high capacity, and effective charge and discharge efficiency, cycle life, and low-temperature characteristics.

It is another aspect to provide a method of preparing the negative active material for a rechargeable lithium battery.

These and/or other aspects may be achieved by a negative active material for a rechargeable lithium battery including a crystalline carbon core and a shell with a turbostratic or half-onion ring structure coated on the core. The shell includes crystalline micro-particles and semi-crystalline carbon. The core has an intensity ratio Ra I(1360)/I(1580) of a Raman Spectroscopy peak intensity I(1360) at a (1360) plane to an Raman Spectroscopy peak intensity I(1580) at a (1580) plane of 0.01 to 0.45, and the shell has a Raman Spectroscopy intensity ratio I(1360)/I(1580) of 0.46 to 1.5. Alternatively, the negative active material of an embodiment of the present invention includes a crystalline carbon core and a carbon shell coated on the core. The carbon shell includes crystalline carbon micro-particles which are attached to a surface of the crystalline carbon core.

To achieve these and/or other aspects, an embodiment of the present invention provides a method to prepare a negative active material for a rechargeable lithium battery. In this method, a crystalline carbon is pulverized to prepare crystalline carbon macro-particles and carbon micro-particles, and the crystalline carbon macro-particles are shaped spherically to prepare spherical-crystalline carbon particles. The spherical-crystalline particles are agglomerated with the carbon micro-particles to prepare a miniscule particle (hereinafter, referred to as "primary particles") and the primary particles are coated with an amorphous carbon to prepare a carbon mass (hereinafter, referred to as "secondary particles"). Thereafter, the secondary particles are heat-treated.

Additional aspects and/or other advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
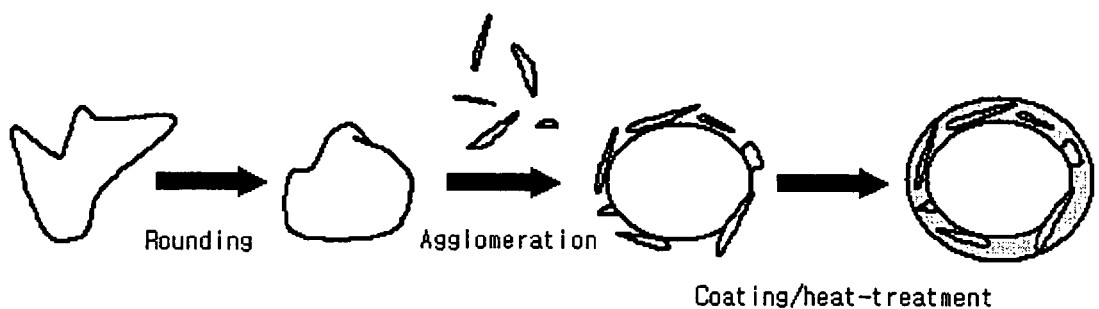
FIG. 1 is a block diagram illustrating procedures to prepare a negative active material of an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The negative active material for a rechargeable lithium battery of an embodiment of the present invention includes a crystalline carbon core and a shell coated on the core. The shell includes a semi-crystalline carbon and crystalline carbon micro-particles which are attached to a surface of the core. The Raman Spectroscopy intensity ratio Ra I(1360)/I(1580) of the shell is larger than the Raman Spectroscopy intensity ratio of the core.

The crystalline carbon core has a Raman Spectroscopy intensity ratio I(1360)/I(1580) of 0.01 to 0.45, while the shell has a turbostratic or half-onion ring structure and a Raman Spectroscopy intensity ratio I(1360)/I(1580) of 0.46 to 1.5. The shell includes crystalline carbon micro-particles in plate form, which have an average diameter (D50) of 0.1 to 15 μm.

A Raman Spectroscopy intensity ratio Ra (I(1360)/I(1580) of the core of more than 0.45 causes a decrease in crystallinity, reducing discharge capacity. A Raman Spectroscopy intensity ratio Ra (I(1360)/I(1580)) of the shell of less than 0.46 causes an increase in reactivity with an electrolyte, decreasing initial efficiency, while that of more than 1.5 causes a decrease in crystallinity, reducing discharge capacity.

The negative active material has a tapping density of 1.20 g/cc to 1.50 g/cc. If the tapping density is less than 1.20 g/cc, the volume per weight of the active material increases and the amount of the active material per volume of the battery decreases, reducing the capacity per volume of the battery. It is impossible to prepare a negative active material having a tapping density of more than 1.50 g/cc.

The negative active material has an average diameter of 25±5 μm, and a BET (specific surface area) of 2.0 to 4.0 m$^3$/g. If the BET is less than 2.0, the discharge capacity decreases, and if the BET is more than 4.0, the initial efficiency decreases.

The negative active material has an X-ray diffraction peak intensity ratio I(110)/I(002) of an X-ray diffraction peak intensity I(002) at a (002) plane to an X-ray diffraction peak intensity I(110) at a (110) plane of 0.1 or less.

The amount of the shell is 0.01 to 15 wt % based on the total weight of the negative active material.

A negative active material preparation of the present invention will be illustrated in more detail in reference with the accompanying FIG. 1.

Crystalline carbon is pulverized to prepare crystalline carbon particles with an average diameter (D50) of 5 to 50 μm (hereinafter, referred to as "macro-particles"), and crystalline micro-particles with an average diameter (D50) of 0.1 to 15 μm. The macro-particles and the micro-particles have a plate shape.

The crystalline carbon may be natural graphite or artificial graphite.

The macro-particles are shaped as spheres to prepare spherical crystalline carbon particles. The spherical crystalline carbon particles and the crystalline carbon micro-particles that are not spherically-shaped are mechano-chemically agglomerated to prepare primary particles.

The mixing ratio of the spherical crystalline carbon particles and the crystalline microparticles is generally 70 to 99.99:0.01 to 30 by weight ratio. If the mixing ratio is outside these ranges, the agglomeration of the spherical particles and the micro-particles does not occur, and the spherical particles and the micro-particles are respectively lumped to prepare undesired products.

According to the agglomeration, the micro-particles are attached to a surface of the spherical particles so that discharge capacity increases.

The micro-particles (average diameter of 0.1 to 15 μm) are agglomerated 104 on a surface of the spherical particles (average diameter of 5 to 50 μm) so that it reduces the revealing of edge portions of the graphite, and it allows the graphite to have a random orientation.

The operation of spherically-shaping is different from the agglomerating operation. The spherically-shaping operation is performed by agitating particles with diameters of a regular distribution at high rotating rates (300 to 1000 rpm) for repeated short time spans over an extended period of time, that is, at a high shear force, to modify a surface of the particle.

The agglomerating operation is performed by adding several wt % of micro-particles (<5 μm) to the spherically-shaped large particles (about 20 to 30 μm) and agitating the mixture with a blade which imparts a shear force (e.g., a circular blade) at low rotating rates (500 to 1000 rpm). At this time, the particles are agglomerated by mechanical collision.

The primary particles include micro-particles to facilitate effective conductivity. The macro-particles are generally several tens to hundreds of times larger in diameter than the micro-particle.

The primary particles are mixed with amorphous carbon in the weight ratio of 50 to 99.99 wt %:0.01 to 50 wt %. If the amount of the amorphous carbon is less than 50 wt %, reactivity with an electrolyte increases, reducing the initial efficiency. If the amount of the amorphous carbon is more than 99.99 wt %, the discharge capacity decreases. The amorphous carbon may be coal tar pitch or petroleum pitch.

The mixture is heat-treated at 1000 to 3200° C., and generally 2000 to 2700° C. under an inert atmosphere to prepare a negative active material for a rechargeable lithium battery. The negative active material includes a crystalline carbon core and a carbon shell. The carbon shell includes semi-crystalline carbon derived from amorphous carbon. If the heat-treatment temperature is less than 1000° C., the discharge capacity decreases, and heat-treating at more than 3200° C. is substantially impossible.

The carbon shell has a turbostratic or half-onion ring structure, and includes crystalline carbon micro-particles, especially plate-shaped micro-particles. During the heat-treatment, the amorphous carbon is partially vaporized to leave 0.01 to 15 wt % as the amorphous carbon shell and 80 to 99.99 wt % of the crystalline carbon core.

A negative active material produced by the procedure has improved orientation of crystallinity on its surface and improves packing density. In addition, microporous channels are formed between the primary particles. Owing to the microporous channels, the electrolyte is easily immersed into the negative active material of an embodiment of the present invention. Accordingly, the negative active material provides a battery having improved low-temperature charge and discharge and cycle life characteristics.

The following examples further illustrate the present invention in detail, but are not to be construed to limit the scope thereof.

EXAMPLE 1

Natural graphite was pulverized to obtain plate-shaped macro-particles with an average diameter (D50) of 30 μm and plate-shaped micro-particles with an average diameter (D50) of 2 μm. The macro-particles were shaped spherically to prepare spherical crystalline carbon particles. The plate-shaped micro-particles were added to the spherical crystalline carbon particles and mechanically agglomerated to prepare primary particles (FIG. 1).

The primary particles were mixed with petroleum pitch in the weight ratio of 90:10 wt % without use of a solvent to uniformly coat the petroleum pitch on a surface of the primary particles. The coated primary particles were heat-treated at 2200° C. under an argon atmosphere and sieved, thus obtaining a negative active material with an average diameter (D50) of 24 μm.

EXAMPLE 2

A negative active material was prepared by the same procedure as in Example 1, except that the primary particles were mixed with the petroleum pitch in the weight ratio of 95:5 wt %.

EXAMPLE 3

A negative active material was prepared by the same procedure as in Example 1, except that the primary particles were mixed with the petroleum pitch in the weight ratio of 85:15 wt %.

EXAMPLE 4

A negative active material was prepared by the same procedure as in Example 1, except that the heat-treatment was performed at 1800° C.

EXAMPLE 5

A negative active material was prepared by the same procedure as in Example 1 except that the heat-treatment was performed at 1400° C.

COMPARATIVE EXAMPLE 1

Natural graphite (available from China) was pulverized to obtain a negative active material with an average diameter (D50) of 30 μm.

COMPARATIVE EXAMPLE 2

Natural graphite (available from China) was pulverized to obtain plate-shaped macroparticles with an average diameter (D50) of 30 μm. The plate-shaped macro-particles were shaped spherically to prepare spherical particles. The spherical particles were sieved to obtain a negative active material with an average diameter (D50) of 24 μm.

COMPARATIVE EXAMPLE 3

Natural graphite (available from China) was pulverized to obtain plate-shaped macroparticles with an average diameter (D50) of 30 μm. The macro-particles were shaped spherically to prepare spherical particles. The spherical particles were heat-treated at 2200° C. under an argon atmosphere and sieved, thus obtaining a negative active material with an average diameter (D50) of 24 μm.

COMPARATIVE EXAMPLE 4

Natural graphite (available from China) was pulverized to obtain macro-particles with an average diameter (D50) of 30 μm. The macro-particles were mixed with petroleum pitch in the weight ratio of 90:10 wt % without use of a solvent to uniformly coat the petroleum pitch on the surface of the macro-particles. The coated macro-particles were heat-treated at 2200° C. under an argon atmosphere and sieved, thus obtaining a negative active material with an average diameter (D50) of 24 μm.

Tapping Density Measurement

Tapping densities of the negative active materials according to Examples 1 to 5 and Comparative Examples 1 to 4 were measured by the following procedure with an MT-1000 (available from SEISHIN CO.) device.

The negative active material was slowly charged into a 100 ml mass cylinder of which weight was previously measured, with a spoon through a 250 mm mesh until a volume of the negative active material reached 100 ml. A weight (M1) of the negative active material charged mass cylinder was measured. A weight (M) of the negative active material was obtained by subtraction of the original weight of the mass cylinder (M0) from the weight (M1).

Thereafter, the negative active material charge mass cylinder was covered with a rubber plate and was dropped 500 times from a height of 18 mm, and a volume (V) of the packed negative active material was measured.

Using the weight of M and the volume of V, tapping densities were determined by the following mathematics formula 1.

Mathematical formula 1

$$D = (M - M0)/V$$

D: Tapping density (g/cc)
M0: Weight of mass cylinder (g)
M: Weight of negative active material (g)
V: Volume of negative active material after being dropped 500 times The results are present in Table 1.

TABLE 1

| | Whether spherical-shaping step is performed or not | Pitch (wt %) | Heat-treatment temperature (° C.) | Tapping density (g/cc) |
|---|---|---|---|---|
| Example 1 | Yes | 10 | 2200 | 1.25 |
| Example 2 | Yes | 5 | 2200 | 1.20 |
| Example 3 | Yes | 15 | 2200 | 1.28 |
| Example 4 | Yes | 10 | 1800 | 1.20 |
| Example 5 | Yes | 10 | 1400 | 1.21 |
| Comparative Example 1 | No | — | — | 0.40 |
| Comparative Example 2 | Yes | — | — | 1.08 |
| Comparative Example 3 | Yes | — | 2200 | 1.12 |
| Comparative Example 4 | No | 10 | 2200 | 0.55 |

Figure 2:
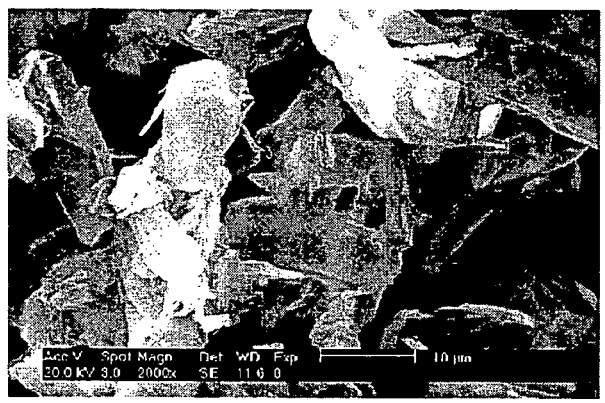
FIG. 2 is a scanning electron micrograph (SEM) of a negative active material according to Comparative Example 1.
Figure 3:
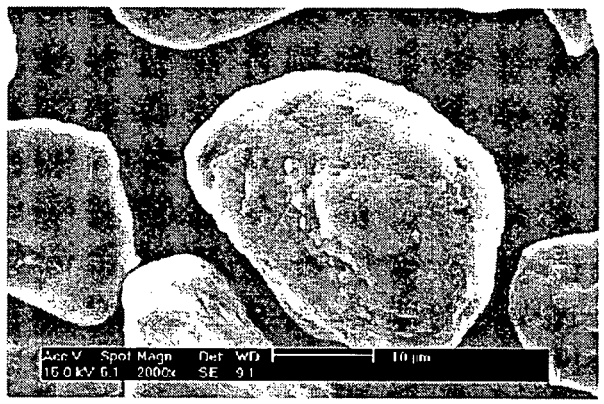
FIG. 3 is a SEM of a negative active material according to Example 1 of the present invention.

As shown in Table 1, when the spherical-shaping step has been performed, as the amount of the pitch increases the tapping densities increase, and as the heat-treatment temperature increases, the surface area caused by stress decreases, and the tapping densities increase from 0.4 g/cc to more than 1.0 g/cc. The particles after natural graphite is pulverized are present as the flake-type or plate-shaped particles as shown in FIG. 2. The resulting particles are spherically-shaped, agglomerated, coated and heat-treated to obtain particles as shown in FIG. 3 (Example 1) to increase tapping density. The improved tapping density facilitates preparation of a slurry and simpler electrode production.

Figure 4:
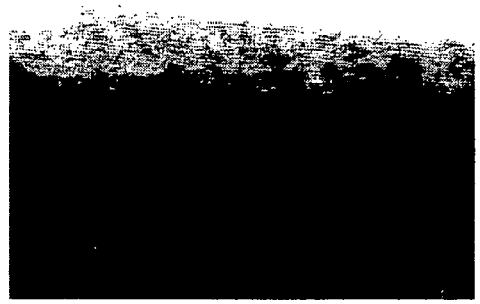
FIG. 4 is a transmission electron micrograph (TEM) of a negative active material according to Comparative Example 1.
Figure 5A:
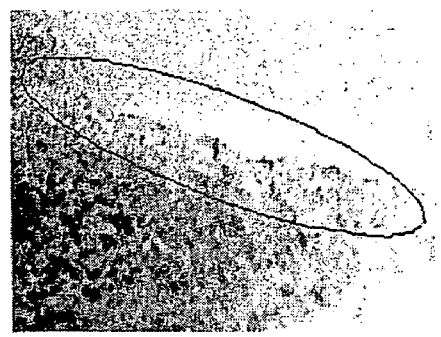
FIGS. 5A and 5B are TEMs of a negative active material according to Example 1 of the present invention.
Figure 5B:
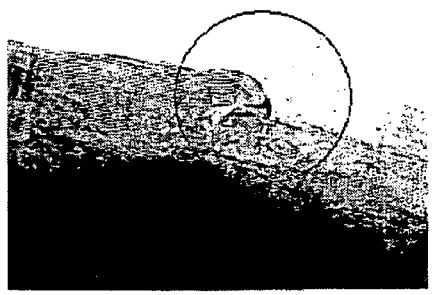

The negative active material according to Comparative Example 1 (FIG. 4) reveals The plate structure of natural graphite. However, the negative active material has a turbostratic or half-onion ring structure on an edge portion, as shown in FIG. 5A, and FIG. 5B indicates an enlarged drawing of an edge portion shown in FIG. 5A. The turbostratic structure is characterized by a quasi-amorphous state and a more or less disordered orientation due to a radically low degree of crystallization and a minimal crystalline size. The structure may be obtained by coating low-crystallinity carbon on a high-crystallinity carbon core and heat-treating at a high temperature to develop the low-crystallinity carbon into semi-crystalline carbon and to modify a structure of an edge portion thereof. FIG. 5A indicates that the turbostratic structure is uniformly present on the surface of the negative active material. The turbostratic structure enables a reduction in a side reaction between the electrolyte and the active material, and increases a crystallinity of the core, resulting in an effective discharge capacity.

Raman Spectroscopy Measurement

The Raman Spectroscopy was measured by the following procedure in order to identify crystallinity of the surface of the negative active material, and the results are presented in Table 2.

Using an argon laser with a 514.5 nm frequency, peak areas were respectively measured at 1360 cm$^{-1}$ (D band, disorder) and 1580 cm$^{-1}$ (G band, order) under a condition of an exposed time of 60 seconds. The ratio of the peak area (D/G) was calculated. In addition, the Raman Spectroscopy of the core and the shell was respectively measured after and before etching the negative active material.

The results show that the core has a Raman Spectroscopy ratio of 0.45 or less which indicates high crystallinity, and the carbon shell has a ratio of 0.46 to 1.5, which indicates semi-crystallinity. It is expected that if the heat-treatment is performed at low temperatures (2000° C. or less), the shell will have low crystallinity (1.5 or more).

TABLE 2

| | Whether spherically-shaping step is performed or not | Pitch (wt %) | Heat-treatment temperature (° C.) | Raman Spectroscopy intensity ratio (1360 cm$^{-1}$/ 1580 cm$^{-1}$) | |
|---|---|---|---|---|---|
| | | | | Core (after etching) | Surface (before etching) |
| Example 1 | Yes | 10 | 2200 | 0.40 | 0.65 |
| Example 2 | Yes | 5 | 2200 | 0.39 | 1.20 |
| Comparative Example 1 | No | — | — | 0.35 | 0.40 |

Each of the negative active materials according to Examples 1 to 5 and Comparative Examples 1 to 4 was mixed with styrene-butadiene rubber and a carboxymethyl cellulose binder (viscosity increasing agent) in a solvent to prepare a negative active material slurry. The slurry was coated on Cu foil and dried, followed by pressing into a negative electrode with an active mass of 1.6 g/cc. Using the negative electrodes and lithium metal reference electrodes, 2016 coin-type half cells were fabricated. As an electrolyte, 1 M LiPF$_6$ in a mixed solvent of ethylene carbonate, ethylmethyl carbonate and propylene carbonate (30:60:10 volume ratio) was used.

In addition, using the negative electrodes, and LiCoO$_2$ positive electrode, full cells with a 750 mAh capacity were fabricated.

The low-temperature and the cycle life characteristics of the half-cells and the full cells were evaluated by the following procedure.

The low-temperature characteristic was indicated as a percentage value of discharge capacity at a low temperature with respect to room temperature. The discharge capacity was obtained by charging at 0.5 C (375 mAh) and allowing to stand at −20° C. for 4 hours followed by discharging at 0.5 C (375 mAh).

The cycle life characteristic was indicated as a percentage value of capacity for the 100th cycles to that for the 1$^{st}$ cycle. The capacity was obtained by charging at 1 C (750 mAh) and discharging at 1 C (750 mAh) at room temperature.

The discharge capacity and the initial efficiency of the half cells are shown in Table 3. It is evident from Table 3 that, as the amount of the pitch increases, the initial efficiency increases in Examples 1 to 5. When using the same amount of pitch, as the heat-treatment temperature increases, the discharge capacity increases in Examples 1 to 5. The cells according to Comparative Examples 1 to 4 exhibit lower initial efficiencies than the efficiencies according to Examples 1 to 5.

TABLE 3

| | Whether the spherically-shaping step is performed or not | Pitch (wt %) | Discharge capacity (mAh/g) | Initial efficiency (%) |
|---|---|---|---|---|
| Example 1 | Yes | 10 | 355 | 94.5 |
| Example 2 | Yes | 5 | 355 | 93.0 |
| Example 3 | Yes | 15 | 340 | 95.0 |
| Example 4 | Yes | 10 | 345 | 94.0 |
| Example 5 | Yes | 10 | 340 | 94.0 |
| Comparative Example 1 | No | — | 355 | 80.0 |
| Comparative Example 2 | Yes | — | 355 | 84.0 |
| Comparative Example 3 | Yes | — | 353 | 86.0 |
| Comparative Example 4 | No | 10 | 350 | 90.0 |

The cycle life and the low-temperature characteristics are shown in Table 4. The cycle life characteristic is similar to the efficiency of the half-cell, and the low-temperature characteristic has a relationship with the tapping density. It is considered that a higher tapping density, which indicates a low amount of micro-pores in an electrode, facilitates movement of the organic electrolyte at −20° C., thus improving the low-temperature characteristic.

TABLE 4

| | Whether the spherically-shaping step is performed or not | Pitch (%) | Cycle life characteristic (%)(100th/1st) | Low-temperature characteristic (%) (−20° C./room temperature) |
|---|---|---|---|---|
| Example 1 | Yes | 10 | 94 | 65 |
| Example 2 | Yes | 5 | 90 | 55 |

TABLE 4-continued

| | Whether the spherically-shaping step is performed or not | Pitch (%) | Cycle life characteristic (%)(100th/1st) | Low-temperature characteristic (%) (−20° C./room temperature) |
|---|---|---|---|---|
| Example 3 | Yes | 15 | 93 | 58 |
| Example 4 | Yes | 10 | 92 | 56 |
| Example 5 | Yes | 10 | 92 | 50 |
| Comparative Example 1 | No | — | 65 | 25 |
| Comparative Example 2 | Yes | — | 68 | 42 |
| Comparative Example 3 | Yes | — | 72 | 46 |
| Comparative Example 4 | No | 10 | 70 | 30 |

X-ray diffraction peak intensity ratio (I(110)/I(002) Measurement

As the anisotropy of the graphite increases, intensity at (002) decreases, and intensity at the (110) peak increases so that the intensity ratio of I(110)/I(002) increases. The intensity ratio of I(110)/I(002) shows the orientation of the graphite. The random orientation (anisotropic) of the graphite allows active and quick intercalation and deintercalation of lithium ions, thus improving the high-rate characteristic.

The rotating speed to exhibit 10,000 counts or more of a (002) peak intensity should be controlled to determine a reliable intensity ratio of I(110)/I(002). In an embodiment of the present invention, the intensity ratio of I(110)/I(002) was measured by a powdery method at a rotating speed of 0.02°/1 second of an X-ray irradiation. The results are shown in Table 5.

BET Measurement

After the negative active material was dried at 200° C. under a vacuum, a BET was measured at a relative pressure of 0.2 atm. under a nitrogen gas atmosphere with a multi tester (Device: ASAP-2010, available from MICROMETRICS). The results are presented in Table 5.

TABLE 5

| | X-ray diffraction Intensity ratio ($I_{110}/I_{002}$) | BET($m^2/g$) |
|---|---|---|
| Example 1 | 0.0087 | 2.9 |
| Example 2 | 0.0068 | 3.5 |
| Example 3 | 0.0090 | 2.3 |
| Example 4 | 0.0083 | 3.3 |
| Example 5 | 0.0093 | 3.6 |
| Comparative Example 1 | 0.0032 | 7.1 |
| Comparative Example 2 | 0.0041 | 6.7 |
| Comparative Example 3 | 0.0049 | 6.1 |
| Comparative Example 4 | 0.0051 | 5.7 |

As shown in Table 5, the negative active materials according to Examples 1 to 5 and Comparative Examples 1 to 4 have X-ray diffraction intensity ratios ($I_{110}/I_{002}$) of less than 0.01, but the BET values of Examples 1 to 5 of 2.3 to 3.6 $m^2/g$ are much smaller than those of Comparative Examples 1 to 4 of 5.7 to 7.1. These results indicate that the negative active materials according to Comparative Examples 1 to 4 have reduced initial efficiency.

As describe above, the negative active material of an embodiment of the present invention has a turbostratic or half-onion ring structure on a surface thereof, and has improved tapping density and low-temperature characteristics. In addition, the negative active material reduces a side reaction between the electrolyte and the active material, and increases a crystallinity of the core, resulting in a good discharge capacity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative active material of a rechargeable lithium battery comprising:
   a crystalline carbon core having an intensity ratio Ra I(1360)/I(1580) of a Raman Spectroscopy peak intensity I(1360) at a (1360) plane to a Raman Spectroscopy peak intensity I(1580) at a (1580) plane of substantially 0.01 to 0.45; and
   a shell with a turbostratic or half-onion ring structure coated on the core, the shell consisting essentially of crystalline carbon micro-particles and semi-crystalline carbon, the shell having an intensity ratio Ra I(1360)/I(1580) of a Raman Spectroscopy peak intensity I(1360) at a (1360) plane to a Raman Spectroscopy peak intensity I(1580) at a (1580) plane of substantially 0.46 to 1.5.

2. The negative active material of claim 1, wherein the crystalline carbon micro-particles have an average diameter (D50) of substantially 0.1 to 15 μm.

3. The negative active material of claim 1, wherein the crystalline carbon micro-particles have a plate shape.

4. The negative active material of claim 1, wherein the negative active material has a tapping density of substantially 1.20 to 1.50 g/cc.

5. The negative active material of claim 1, wherein the crystalline carbon are natural graphite or artificial graphite.

6. The negative active material of claim 1, wherein an amount of the shell is substantially 0.01 to 15 wt % based on a weight of the negative active material.

7. The negative active material of claim 1, wherein the negative active material has an average diameter of substantially 25±5 μm.

8. The negative active material of claim 1, wherein the negative active material has a BET specific surface area, of substantially 2.0 to 4.0 $m^2/g$.

9. The negative active material of claim 1, wherein the negative active material has an intensity ratio I(110)/I(002) of an X-ray diffraction peak intensity I(002) at a (002) plane to an X-ray diffraction peak intensity I(110) at a (110) plane of less than 0.01.

10. A negative active material of a rechargeable lithium battery comprising:
    a crystalline carbon core; and
    a carbon shell coated on a surface of the crystalline carbon core, the carbon shell consisting essentially of crystalline carbon micro-particles.

11. The negative active material of claim 10, wherein an intensity ratio Ra I(1360)/I(1580) of a Raman Spectroscopy peak intensity I(1360) at a (1360) plane to an Raman Spectroscopy peak intensity I(1580) at a (1580) plane of the shell is larger than an intensity ratio Ra I(1360)/I(1580) of a Raman Spectroscopy peak intensity I(1360) at a (1360) plane to an Raman Spectroscopy peak intensity I(1580) at a (1580) plane of the core.

12. The negative active material of claim 11, wherein the crystalline carbon core has an intensity ratio Ra I(1360)/I (1580) of a Raman Spectroscopy peak intensity I(1360) at a (1360) plane to a Raman Spectroscopy peak intensity I(1580) at a (1580) plane of substantially 0.01 to 0.45 and the shell has an intensity ratio Ra I(1360)/I(1580) of a Raman Spectroscopy peak intensity I(1360) at a (1360) plane to an Raman Spectroscopy peak intensity I(1580) at a (1580) plane of substantially 0.46 to 1.5.

13. The negative active material of claim 10, wherein the negative active material has an X-ray diffraction intensity ratio ($I_{110}/I_{002}$) of less than 0.01 and a BET surface area of approximately 2.3 to 3.6 m²/g.

14. The negative active material of claim 10, wherein the crystalline carbon micro-particles have a plate shape.

15. The negative active material of claim 10, wherein the negative active material has a tapping density of substantially 1.20 to 1.50 g/cc.

16. The negative active material of claim 10, wherein the crystalline carbon microparticles are natural graphite or artificial graphite.

17. The negative active material of claim 10, wherein an amount of the carbon shell is substantially 0.01 to 15 wt % based on a weight of the negative active material.

18. The negative active material of claim 10, wherein the negative active material has an average diameter of substantially 25±5 μm.

19. The negative active material of claim 10, wherein the negative active material has a BET, specific surface area, of substantially 2.0 to 4.0 m³/g.

20. The negative active material of claim 10, wherein the negative active material has an intensity ratio I(110)/I(002) of an X-ray diffraction peak intensity I(002) at a (002) plane to an X-ray diffraction peak intensity I(110) at a (110) plane of less than 0.01.

21. A negative active material of a rechargeable lithium battery comprising:

a crystalline carbon core; and a carbon shell coated on a surface of the crystalline carbon core, the carbon shell consisting essentially of crystalline carbon micro-particles and semi-crystalline carbon.

* * * * *